United States Patent [19]

Gyugyi

[11] 4,353,024
[45] Oct. 5, 1982

[54] CONTROL FOR VAR GENERATOR WITH DEADBAND

[75] Inventor: Laszlo Gyugyi, Pittsburgh, Pa.

[73] Assignee: Westinghouse Electric Corp., Pittsburgh, Pa.

[21] Appl. No.: 158,107

[22] Filed: Jun. 10, 1980

[51] Int. Cl.³ .............................................. G05F 1/70
[52] U.S. Cl. .................................. 323/211; 323/210
[58] Field of Search ................................ 323/205–211

[56] References Cited

U.S. PATENT DOCUMENTS

| | | | |
|---|---|---|---|
| 3,936,727 | 2/1976 | Kelley | 323/102 |
| 3,999,117 | 12/1976 | Gyugyi et al. | 323/19 |
| 4,055,795 | 10/1977 | Mathieu | 323/211 |
| 4,204,150 | 5/1980 | Mathieu | 323/211 |
| 4,234,843 | 11/1980 | Gyugyi et al. | 323/210 |
| 4,307,331 | 12/1981 | Gyugyi | 323/210 |

Primary Examiner—William H. Beha, Jr.
Attorney, Agent, or Firm—M. J. Moran

[57] ABSTRACT

A VAR generator of the switched capacitor controlled reactor type is shown utilized for a power transmission system. The control arrangement is such that the thyristor controlled capacitor and reactor banks are kept switched out for small terminal voltage variations which can be tolerated without compensation in order to minimize standby or no load losses in the region of the nominal voltage of the transmission system. Outside of this region VAR compensation is provided.

17 Claims, 7 Drawing Figures

ΔVI = TERMINAL VOLTAGE VARIATION

4,353,024

CONTROL FOR VAR GENERATOR WITH DEADBAND

BACKGROUND OF THE INVENTION

The subject matter of this invention relates generally to VAR generators and more specifically to static VAR generators employing switched inductors used in conjunction with switched capacitors where losses are minimized.

It is known to make VAR generators by connecting a fixed capacitor and a switched inductor in parallel across two lines of a voltage system to be regulated or controlled by the VAR generator. A suitable control system is provided for sending an output signal to the switch portion of the switched inductor to establish a conduction interval during a predetermined period of time. The conduction interval allows current to flow for a portion of the predetermined period of time, thus generating an inductively reactive current which interacts with fixed capacitively reactive current to produce a net reactive current which cooperates with the voltage across the lines to produce reactive power. The predetermined interval of time is usually one-half cycle of the line voltage. Consequently, in a half-cycle-by half cycle basis, the switching interval can be changed to provide differing amounts of reactive power as is determined to be necessary by the calculating or control portion of the system. Systems of the previous type can be found in U.S. Pat. No. 3,936,727, issued Feb. 3, 1976 to F. W. Kelly, Jr. and G. R. E. Laison and U.S. Pat. No. 3,999,117, issued Dec. 21, 1976 to L. Gyugyi et al. The latter patent is assigned to the assignee of the present invention. The values for capacitance and inductance are usually chosen in the prior art so that at a moderate conduction interval for the switched inductor, the thusly produced inductive current is approximately equal to the fixed capacitive current, thus producing zero VAR. Consequently, if the conduction interval is increased, the amount of inductive current increases, producing a net inductive reactive current. On the other hand, if the conduction interval is decreased, the inductive current is decreased, producing a net capacitive reactive current. This gives positive and negative VAR capability to the system. A system of this type has a number of problems, however. On problem lies in the fact that even at standby or a disposition of no VAR generation, appreciable power generation is required in each of the inductive and capacitive components of the system. Said another way, in a system of the type previously mentioned, significant inductive current is generated at the time when no VAR correction of production is required because the significant inductive current is utilized to cancel the oppositely phased capacitive current. This means that there are relatively high standby losses. Furthermore, for any given amount of VAR correction, either negative or positive, a minimum capacitance and inductance is required. An improvement on the aforementioned system includes utilization of an inductive branch and a capacitive branch in which the inductive branch operates independently of the capacitive branch, and vice versa. In this system, at standby, neither the inductive portion of the system nor the capacitive portion of the system conducts appreciable current and therefore the standby losses are lower than in the aforementioned system. Net inductive current is provided by using the inductive portion of the system exclusively; and net capacitive current is provided by using the capacitive portion of the system exclusively. However, the problem is present with this kind of system in that the capacitive branch of such a system is not conducive to continuous switch control over a wide range of capacitive currents, as is the case with the inductive portion of the system. In the prior art, therefore, the capacitive portion of such a system utilizes a bank of discrete capacitors, each having a separate switch. The net capacitive reactance for capacitive VAR production is provided by judiciously picking combinations of capacitors in the bank of capacitors to provide discrete values of capacitance. Nevertheless, such a system has the inherent disadvantage of only allowing discrete values of capacitive current to be produced. Thus, continuous control is difficult, if not impossible. In the range of capacitive VAR demand, only a relatively few values of capacitive current are available because of the discrete nature of the system. As a consequence, VAR compensation or correction in the capacitive current range tends to be an approximation. This problem was resolved in the prior art by providing a VAR generator with a continuous range of VAR correction which covers both negative and positive VAR generation. Inductive apparatus and capacitive apparatus are utilized in conjunction in such a manner that the inductive apparatus provides essentially the entire VAR generation for net inductive VAR demand but where discrete capacitors are utilized in conjunction with the same inductor to provide VAR generation over a continuous range for net capacitive demand. An appropriate control system decides the direction and magnitude of VAR demand. It has been found, however, that for certain types of systems to be compensated by the VAR generator it would be economically advantageous to keep the VAR output essentially zero to reduce losses when the terminal voltage variation is relatively small and only minimal compensation is required. It would be advantageous therefore if a VAR generator with attendant control system could be found which had an inactive VAR generating band around zero VAR's.

SUMMARY OF THE INVENTION

In accordance with the invention a VAR generator for an electrical system in which VAR demand is generally to be a function of the electrical system voltage is provided in which a VAR generator is interconnected with the electrical system and controllable for producing volt amps reactive (VAR's) for the electrical system as a function of the system voltage. Furthermore, control apparatus is interconnected with the electrical system and with the VAR generator for determining what the system voltage is and for controlling the VAR generator to produce the volt amps reactive as a function of the voltage. In addition, an override is connected as part of the control apparatus for preventing the production of the volt amps reactive when the system voltage lies within a predetermined range.

BRIEF DESCRIPTION OF THE DRAWINGS

For a better understanding of the invention reference may be had to the preferred embodiments thereof exemplary of the invention shown in the accompanying drawings in which.

DESCRIPTION OF THE PREFERRED EMBODIMENTS

Figure 1:
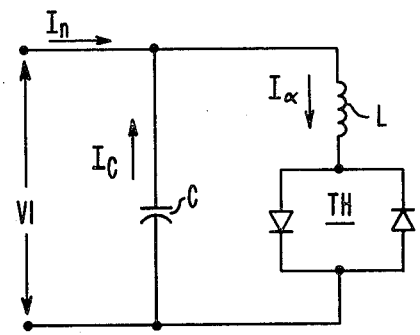
FIG. 1 shows a prior art static VAR generator.

Referring now to the drawings and prior art FIG. 1 in particular, there is shown a basic VAR generator for a single phase AC electrical system. It should be noted that the principles discussed herein are applicable to polyphase AC electrical systems. In general the VAR generator consists of a fixed capacitor C and a thyristor controlled inductor L. At zero leading VAR demand the thyristor switch TH is closed and the inductive effect of the inductor L cancels the capacitive effect of the capacitor C so that the net inductive current $I_\alpha$ provided for the AC system is zero. That is the vector sum of the capacitor current $I_\alpha$ and the inductor current $I_\alpha$ is equal to zero. The voltage across the parallel combination which includes the capacitive element C, and the inductive element L and the thyristor switch TH is equal to V1. At some non-zero leading VAR demand, the closing of the switch TH is appropriately delayed in each half cycle of the alternating current by a variable angle which shall be called the firing angle $\alpha$ which is measured with respect to the peak of the supply voltage V1 in order to reduce the current $I_\alpha$ flowing in the inductor L.

Figure 2:
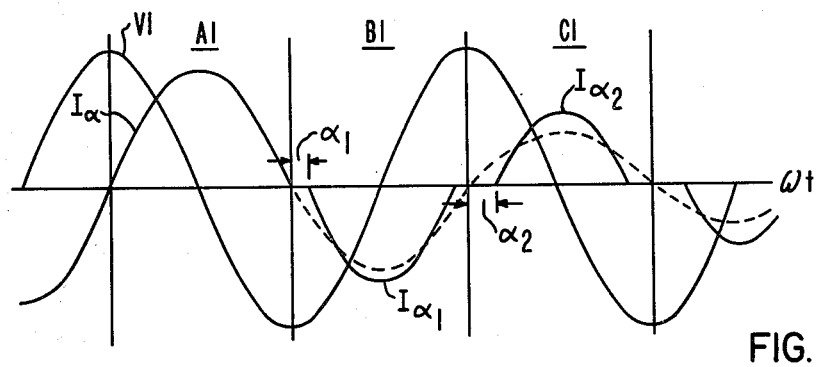
FIG. 2 shows a plot of VAR generator voltage and controlled inductor current vs. ωt for the apparatus of FIG. 1.

Referring now to FIG. 2 there is shown a plot of voltage V1 and current $I_\alpha$ vs. ωt. The curves of FIG. 2 are arbitrarily divided into three zones designated A1, B1 and C1 each of which begins with the maximum positive or negative value of V1 in each half cycle as the case may be. It will be noted that in region A1 the inductor current $I_\alpha$ lags the inductor voltage V1 by 90° and the firing angle $\alpha$ is zero. However, with an increasing firing angle $\alpha$ in the region between 0° and 90° the inductive current $I_\alpha$ decreases and consequently the leading VAR provided for the AC system increases. At maximum leading VAR demand the switch TH of FIG. 1 is opened. This occurs at $\alpha$ equal 90°. When this happens the current $I_\alpha$ in the inductor L in FIG. 1 is zero and therefore the maximum rated capacitive current $I_C$ is provided for compensation. FIG. 2 shows in region B1 that for a delay or firing angle $\alpha_1$, the inductive current $I_{\alpha 1}$ flows for a shorter period of time than the current $I_\alpha$ shown in region A1. Likewise in region C1 where the firing angle or delay is $\alpha_2$ (where $\alpha_2$ is greater than $\alpha_1$) the inductor current $I_{\alpha 2}$ flows for an even shorter period of time than those inductive currents $I_\alpha$ and $I_{\alpha 1}$ shown in regions A1 and B1 respectively.

Figure 3:
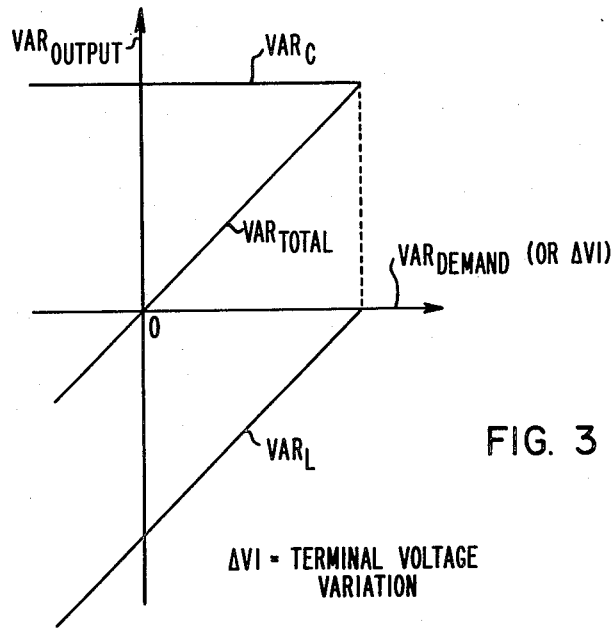
FIG. 3 shows a plot of VAR output vs. VAR demand for the system of FIG. 1.

Referring now to FIG. 3 there is shown a plot of VAR demand ($VAR_{DEMAND}$) as measured by the change in voltage (ΔV1) at the terminals shown in FIG. 1 versus VAR output ($VAR_{OUTPUT}$). The thyristor controlled inductor type VAR generator opposes constant capacitive VAR output ($VAR_C$) from the fixed capacitor C by the variably inductive VAR output ($VAR_L$) of the thyristor controlled inductor L to obtain the actual VAR output $VAR_{Total}$ required for compensation. Consequently at zero VAR demand the capacitive and inductive VAR's cancel. This means that the total current of the capacitor bank C is circulated through the reactor bank L via the thyristor switch TH resulting in appreciable standby or no load losses. These losses decrease with increasing capacitive VAR output, that is with reduced current $I_{60}$ and conversely increase with increasing inductive output that is with increased current I.

In a thyristor switched capacitor and thyristor controlled reactor scheme which will be described in more detail with respect to FIG. 4 in which generally a number of switched capacitor banks are used in conjunction with a single conduction controlled inductor bank the rating of the inductor can be as low as that of one capacitor bank and still provide continuously variable output in the total capacitive VAR range of the static VAR generator. In this case the capacitive VAR output is increased in discrete steps to approximate the VAR demand with a net capacitive VAR surplus and only a relatively small amount of inductive VARs are needed to cancel the surplus capacitive VARs. This scheme is analogous within the operating range of the controlled inductor as a relatively small conventionally controlled inductor scheme with a fixed capacitor similar to what was described with respect to FIG. 1. The rating of the inductor L is kept relatively low and the value of the fixed capacitor C is changed in discrete steps so as to keep the operation of the inductor L within its normal operating range at any VAR output between zero and the maximum rating of the static VAR generator. As a consequence of this operating principle the losses in the vicinity of zero VAR demand are relatively low and they increase on the average in proportion with the VAR output. The losses at zero VAR output theoretically could be zero by switching all capacitors and the single inductor bank out. However, in response to a very small variation in the terminal voltage that a VAR generator is to regulate the control circuit which will be described hereinafter develops a VAR demand signal which would switch in the first capacitor bank and would establish appropriate current in the controlled inductor bank increasing the losses substantially in a step-like manner. It has been found, however, that in many applications particularly in the compensation of electrical power transmission lines where the static VAR generator is primarily used for dynamic compensation to improve the transient stability of the power system it would be economically advantageous to keep the VAR output essentially zero to reduce losses when the terminal voltage variation is relatively small and compensation is not required. This requires a special VAR output vs. terminal voltage characteristic with an inactive voltage band for the static VAR generator.

Figure 4:
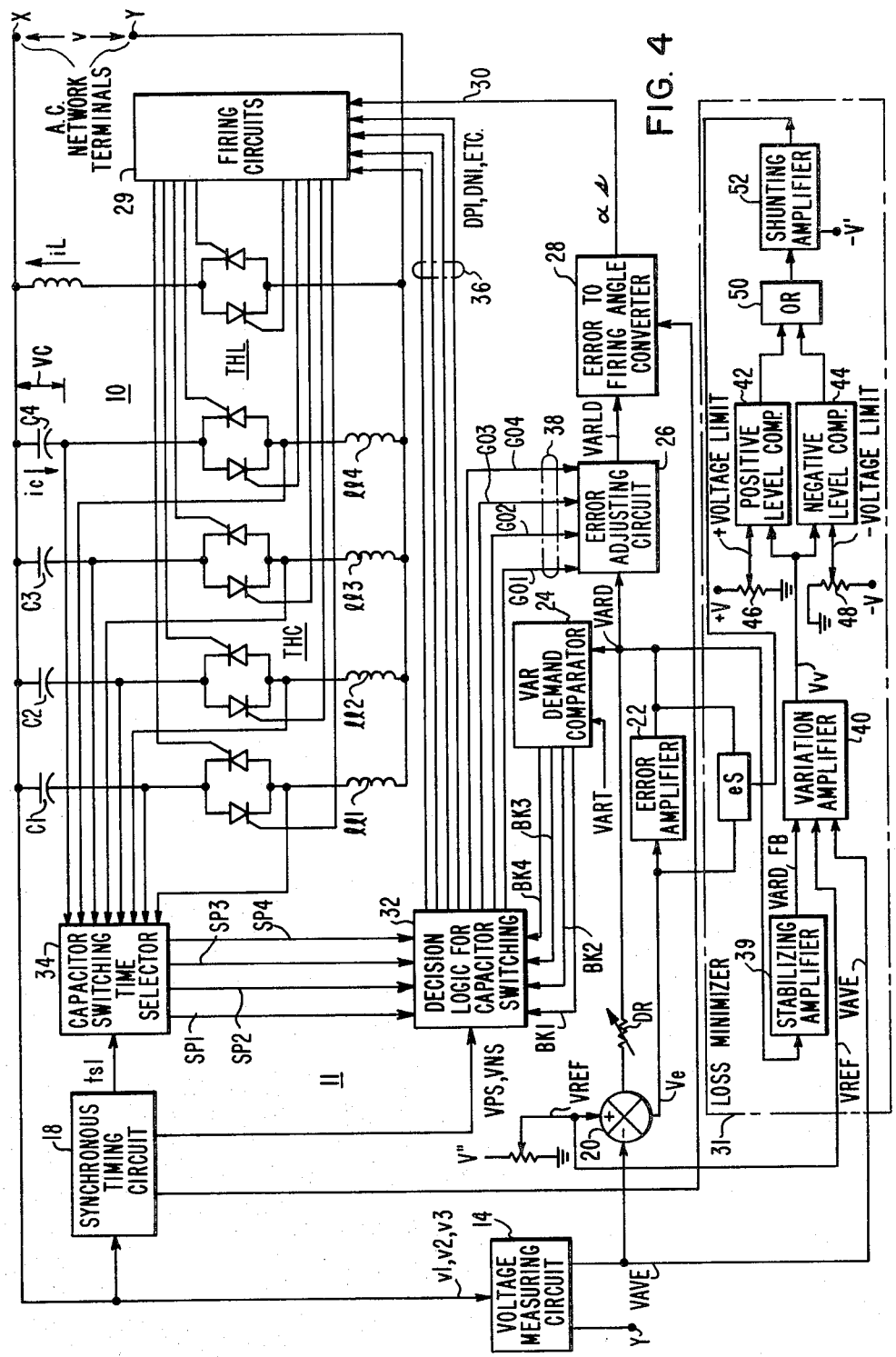
FIG. 4 shows a control system and VAR generator which utilizes a deadband of VAR generation in a predetermined range.

Referring now to FIG. 4 such a VAR generator and its control system 10 is shown and described. The VAR generator system 10 is connected at terminals X and Y to two lines (not shown) of an electrical system across which the voltage v is present. In this embodiment of the invention, the only means of communication with the electrical system is provided at the terminals X and Y although that is not limiting. The production of VARs or volt amps reactive, is useful for many purposes in an electrical system. As an example, such production tends to be useful for voltage compensation among other things. In another instance, the network voltage v may drop or rise from a nominal ideal value as load conditions change in the electrical system. Change in the voltage v beyond a certain predetermined tolerance range is undesirable in many electrical systems. The VAR generator may produce sufficient reactive current or reactive power to compensate for the change in the voltage v thus boosting it when it has fallen or reducing it when it has risen. The production of the reactive current is dependent upon VAR generating apparatus which usually includes capacitive elements and inductive elements and a control system for firing the various elements or introducing them into the circuit on half cycle by half cycle intervals in accordance with calculated VAR demand signal. In this particular embodiment of the invention, the control system 11 may include a voltage measuring circuit 14, a synchronous timing circuit 18, an error generator 20, an error amplifier 22, a VAR demand comparator 24, an error adjusting circuit 26, an error to firing angle converter 28, firing circuits 29 and a loss minimizer 31. In addition a decision logic for capacitor switching circuit 32 and a capacitor switching time selector 34 may also be provided. Incorporation by reference is hereby made of U.S. Pat. No. 4,307,331, issued Dec. 22, 1981, on U.S. patent application No. 942,839, filed Sept. 15, 1978 by Laszlo Gyugyi and entitled "Hybrid Switched-Capacitor Controlled-Inductor Static Var Generator And Control Apparatus". Specifically, FIG. 7 thereof is incorporated by reference as an example of the "decision logic for capacitor switching" functional block 32. Furthermore, FIG. 11 thereof is also incorporated by reference herein as an illustrative example of the "error adjusting circuit" 26. FIGS. 8–10 of the aforementioned issued patent application are also incorporated by reference herein. Also incorporated by reference herein, in regard to the aforementioned issued patent application, see page 21, line 1 of the specification through page 25, line 14 of the underlying patent application therefor. The elements are interconnected with each other and with the various capacitors, inductors and switches of the VAR generator circuit 10 in the following manner. The voltage measuring circuit 14 is interconnected with the terminals X and Y to measure phase voltages v1, v2 and v3, for example, in the case of a three phase electrical system and to provide an output VAVE which is related thereto. The voltage measuring circuit 14 therefor may comprise the input threshold logic control device for the circuit. It may in other embodiments of the invention include a current measuring circuit, a power measuring circuit, or the like. Its principal function is to provide an output which is related to AC network variables and from which an error signal can be derived. In conjunction with the latter point, the VAVE signal from the voltage measuring circuit 14 may be provided to the negative input of an error generator 20 and to the loss minimizer 31 as will be described in greater detail hereinafter. To the positive input of the error generator 20 may be provided a predetermined reference signal VREF which may be derived from a fixed supply voltage V" as shown. Signal VREF may also be provided to the minimizer 31 as will be described in greater detail hereinafter. Signals VAVE and VREF are added algebraically in the error generator 20 to provide an error signal Ve. The error signal Ve may then be provided to error amplifier 22 from which an enlarged error signal VARD is produced. The enlarged error signal VARD is proportional to the error signal Ve. The output of the error amplifier 22 may then be provided simultaneously to four places. That is, the output VARD may be provided by way of a variable droop resistor DR to another negative input terminal of the error generator 20 for closed loop feedback. The droop resistor DR may be adjusted to provide an appropriate droop range for the voltage. The output VARD of the error amplifier 22 may also be provided to the VAR demand comparator 24, to the error adjusting circuit 26 and to the loss minimizer 31. The VAR demand comparator 24 compares the VAR demand signal VARD with a reference signal VART which may be derived from a fixed voltage source (not shown) or from a controlled voltage source (not shown) which is dependent upon network variables. Apparatus 24 provides output signals BK1 through BK4, each of which is related to firing signals for fixed capacitors such as C1 through C4 shown in FIG. 4. These latter signals may in turn be provided in tandem to the decision logic for capacitor switching circuit 32. This circuit compares the discrete levels of VAR demand signals BK1 through BK4 with signals SP1 through SP4 from a capacitor switching time selector 34 and with signals VPS and VNS from the synchronous timing circuit 18. Two sets of output signals are provided from the decision logic for capacitor switching circuit 32. One set of outputs, represented by the lines 36, may be considered the closed loop signals DP1, DN1, etc. These signals may be provided to the firing circuits 29 for actuation of the switches THC and THL for appropriate capacitors C1, C2, C3 or C4 and inductor L respectively. The other set of output signals GO1 through GO4 from the decision logic capacitor switching 32 are provided to the lines 38. This set of lines 38 may be called the feed forward portion of the control circuit 11. These latter signals GO1 through GO4 may be provided as one set of inputs to the error adjusting circuit 26. The other input of error adjusting circuit 26 may be the VAR demand signal VARD. The output from the error adjusting circuit 26 is the adjusted error signal VARLD. Signal VARLD may be provided to the error to firing angle converter 28 which cooperates with the synchronous timing circuit 18 to provide an output signal $\alpha s$ on the line 30 which in turn may be provided to the firing circuits 29 for controlling the phase back ($\alpha$) or conduction angles as the case may be of the thyristor switches THL for the inductor L. The capacitor switching time selector 34 may be connected to measure the voltages across the switches THC so as to provide the output signals SP1 through SP4 in conjunction with the output signal Ts1 from the synchronous timing circuit 18. Essentially, the capacitor switching time circuit 34 picks the appropriate instant of time based on the voltage conditions across the capacitors C1 through C4, for example, for causing conduction through a combination of capacitors C1 through C4 in the most efficient transient free way in accordance with the status of the signals BK1 through BK4 as described previously. The synchronous timing circuit 18 may be similar to the synchronous timing circuit taught in the previously mentioned Pat. No. 3,999,117. The synchronous timing circuit 18 may provide the time reference base for the operation of the entire static VAR generator 10. It has an input which is interconnected with the terminals X and Y for utilizing the AC network terminal voltage v (v1, v2 and/or v3 for a three phase system) in the preferred embodiment of the invention as the basic timing reference for all of the operations of the controller of the static VAR generator 10. The output of the error amplifier 22 or the signal VARD may be supplied as an input to a stabilizing amplifier 39 in the loss minimizer 31. The output of the stabilizing amplifier 39 or the feedback signal VARDFB may be supplied as one input to a variation amplifer 40. Another input to the variation amplifier 40 may be the signal VREF. Still a further input to the variation amplifier 40 may be the signal VAVE as provided from the output of the voltage measuring circuit 14. The variation output signal Vv of the variation amplifier 40 may be provided concurrently to inputs of a positive level comparator 42 and a negative level comparator 44. Another input of the positive level comparator 42 may be provided from a settable potentiometer 46 which is interconnected with a positive voltage source (+V) so that the comparing level of the positive level comparator 42 can be set according to a positive voltage limit (+VOLTAGE LIMIT). Likewise, another input of the negative level comparator 44 may be provided from a settable potentiometer 48 which is interconnected with a negative voltage source. (−V) so that the comparing level of the negative level comparator 44 can be set according to a negative voltage limit (−VOLTAGE LIMIT). The outputs of the positive level comparator 42 and the negative level comparator 44 may be simultaneously provided as inputs to an OR gate 50 the output of which may be supplied to a shunting amplifier 52 which has a negative bias voltage (−V') supplied thereto as an additional input. The output of the shunting amplifier 52 may be provided as the control gate of an electronic switch eS.

OPERATION OF VAR GENERATOR 10

Referring again to FIG. 4, it can be seen that the static VAR generator 10 has three modes of operation. The first mode of operation may be called the exclusive inductive current production mode. In this case, net inductive current is required and the inductor L is utilized exclusively for producing the inductive current. The voltage measuring circuit 14 produces an output signal VAVE which is compared with the VREF signal by the error generator 20. The output signal Ve therefrom is provided to the error amplifier 22 from where it is passed through the error adjusting circuit 26 in a generally unchanged state to produce the signal VARLD. This latter signal is fed to the error to firing angle converter 28 where it produces an appropriate firing angle signal $\alpha s$ for the firing circuits 29. Since no capacitive action is required at this time, the firing circuit 29 fires the bipolar thyristor gates THL during appropriate half cycles to allow current iL to flow through the inductor L during appropriate half cycles of the voltage v to thus provide net inductively reactive current for compensating the voltage between the terminals X and Y. In the next mode of operation, the error amplifier provides the signal VARD which is oppositely signed from the signal VARD produced during the situation where inductive reactive current is desired. In this case, the signal VARD is operated upon by the VAR demand comparator 24 and provides appropriate signals BK1 through BK4 to the decision logic for capacitor switching circuit 32. At an appropriate time, when the voltages across the capacitive elements C1 through C4 are in a proper disposition for firing, the capacitor switching time selector 34 will alert the decision logic for capacitor switching module 32 by way of the signals SP1 through SP4. When the line voltage v is appropriate as determined by the synchronous timing circuit 18, the decision logic for capacitor switching module 32 will provide appropriate signals DP1, DN1, etc. to the firing circuits 29 for actuation of the appropriate thyristor switches THC to switch the properly determined number of capacitors C1 through C4 into parallel circuit relationship with the terminals X and Y to thus produce a discrete level of reactive current. In the event that the discrete level of reactive current chosen is exactly equal to the current sufficient to satisfy the VAR demanded as determined by the VAR demand comparator 24, no further action will be required in the static VAR generator 10. However, the latter event is statistically unlikely. What is more likely is that the third mode of operation will be utilized in which the appropriate VAR demanded will require a capacitive current which is somewhere between the various discrete levels available through all of the combinations of capacitors C1 through C4. If this is the case, the decision logic for capacitor switching circuit 32 will supply a signal on one or more of the lines 38 to the error adjusting circuit 26 which in turn will produce the signal VARLD which is fed to the error to firing angle converter 28 which in turn provides an appropriate signal $\alpha s$ on the line 30 to thus fire the thyristors THL to cause the inductor L to conduct. This is sufficient to cause a component of inductive current to flow which will cancel a portion of the fixed capacitive current thus producing the exact amount of capacitive current, within limits, for producing the amount of capacitive VARs which are equal to the VARS demanded as called for by the error amplifier 22. Therefore, it can be seen that in the negative, that is the inductive range of VAR demand, all capacitor banks are switched off and the inductive VAR is varied by the usual method of phase control of the reactor or inductor L. As the VAR demand becomes positive, that is capacitive, the first capacitor bank is switched in and the reactor is phase controlled to absorb surplus capacitive VARs and thus to provide the VAR output required. When the VAR demand exceeds the rating of the first, second, third, etc. capacitor banks, the second, third, fourth, etc. capacitor banks respectively are switched in and the inductor bank is controlled each time so as to make the VAR output generally equal to the VAR demanded. To ensure that the capacitor banks are not switched in and out in an oscillatory manner above the scheduled switching points, an appropriate hysteresis is provided between the VAR demand values and the places where switching in and switching out actually takes place. This requires that the rating of the inductor reactor bank be higher than that of the single capacitor bank but is deemed necessary in one embodiment of the invention to provide the hysteresis function. The loss minimizer 31 operates by combining the average value VAVE of the AC network voltage v against the previously described reference voltage VREF and the feedback signal VARDFD in the variation amplifier 40. The output signal Vv therefrom is compared against the settable positive voltage level and negative voltage level by the positive level comparator 42 and the negative level comparator 44 respectively. If the variation represented by the signal Vv is small, either or both of the outputs of the positive level comparator and negative level comparator 42 and 44 respectively will go to zero, thus providing zero inputs to the OR gate 50. This provides a zero output to the shunting amplifier 52 which because of its negative bias voltage −V′, causes the electronic switch es to be turned on by the output thereof. This action has a tendency to reduce the gain of the error amplifier 22, thus the output of the error amplifier 22 becomes essentially zero. The VAR demand comparator is set so that this relatively low level signal, i.e. zero, cannot activate the thyristor switches THC of the capacitor banks C1 through C4. On the other hand when the error signal becomes large, that is when the output Vv of the variation amplifier 40 becomes sufficiently large to exceed either or both of the positive and negative voltage limits for the positive level comparator and negative level comparator 42 and 44 respectively, the outputs of one or both of the aforementioned comparators becomes positive. Thus the output of the logic OR gate 50 also becomes positive and the output of the shunting amplifier 52 becomes negative. It is to be presumed that this positive level to the shunting amplifier 52 is large enough to overcome the constant negative bias provided by the other input −V′. As a consequence the analog switch es becomes negatively biased and turns off, allowing the error amplifier 22 to operate with normal gain. When the electronic switch es is turned off and the normal gain is established in error amplifier 22, the VAR demand signal VARD appears at the output thereof. In response to this signal, the VAR generator control activates the appropriate thyristor switches THL and THC of the inductor bank and capacitor bank respectively to produce the desired compensation. The reactive VAR compensation reduces terminal voltage variation. This may cause an unstable operation, that is the input signal Vv to the positive and negative level comparators 42 and 44 respectively would be reduced which in turn could result in the reactivation of the electronic or analog switch es, a reduction in the gain of the error amplifier 22 and the consequent discontinuation of the VAR compensation of the network. This tends to increase the terminal voltage variation, once again actuating the level comparators 42 and 44 to go to zero which causes the analog switch es to turn off and reestablish the normal gain in the error amplifier 22 and the required VAR compensation and so on. It can be seen that this may have an oscillatory effect on the entire system. In order to prevent this and provide stable operation, the inverted output of the error amplifier 22 is fed back to the stabilizing amplifier 39 as mentioned above to compensate for the reduction of the voltage variation input signal Vv after the VAR generator begins to regulate the terminal voltage v. Since the output of the error amplifier 22 is proportional to the VAR compensation provided and the reduction in voltage variation is proportional to this VAR compensation it is possible by the use of the stabilizing amplifier 39, which in a preferred embodiment of the invention is an inverting amplifier, to provide an input signal that represents essentially the uncompensated voltage variation of all output VAR values and to operate the VAR generator in a stable manner. With the use of this loss minimizer 31 and by judiciously picking the positive and negative voltage limits for the positive and negative level comparators 42 and 44 respectively, the losses of the static VAR generator 10 can be kept low or close to zero whenever the terminal voltage variation and the corresponding VAR demand signal VARD are within specific limits by keeping the VAR output of the generator essentially zero. The range of values for variation is settable by utilizing the potentiometers 46 and 44.

Examination of FIG. 4 will show that the control arrangement depicted therein provides the following main functions. It determines how many capacitor banks are to be switched in or out to approximate the compensation VAR demand with the positive (Capacitive) VAR surplus. It determines which capacitor banks can be switched at the switching instance defined for minimum transient disturbance. It determines the inductive VARs necessary to absorb the surplus capacitive VARs provided by the capacitor banks in order to make the VAR generated and the VAR demand equal, it provides an overall closed loop control for the VAR output so as to match the compensating requirement of the AC network and it determines when VAR compensation should not be applied. Consequently, it can be seen that the above circuit provides both closed loop and feed forward control utilizing the same apparatus where necessary in each case.

Figure 5:
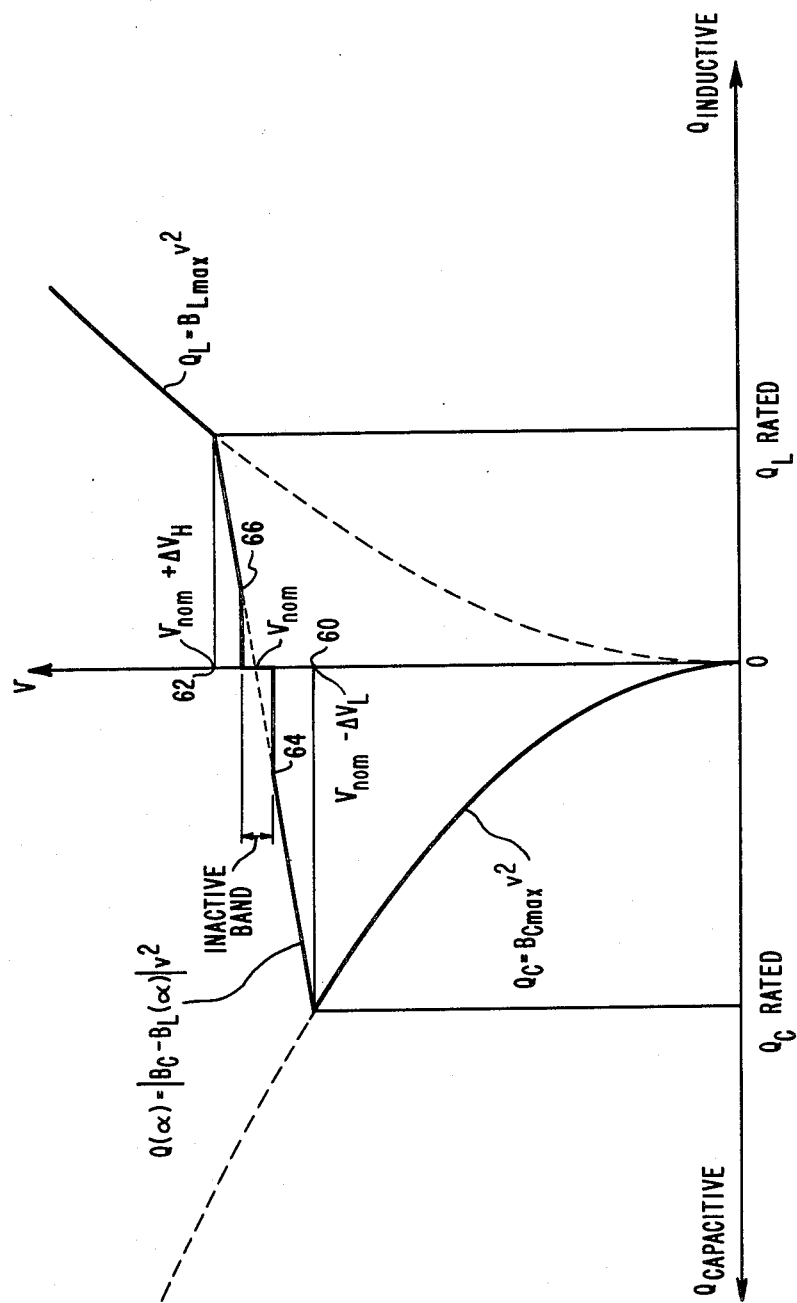
FIG. 5 shows a plot of voltage vs. reactive power for the apparatus of FIG. 4.

Referring now to FIG. 5 a plot of terminal voltage v vs. reactive power (Q) is shown. A normal operating range for the voltage v is established between points 60 and 62 as measured on the vertical axis v of FIG. 5. Outside of this latter mentioned range, that is below the point 60 on the axis v or above the point 62, the VAR generator acts as a capacitor or an inductor respectively. The curve $Q_C = B_{Cmax} v^2$ represents the former situation and the curve $Q_L = B_{Lmax} v^2$ represents the latter situation. Generally, capacitive reactive power is represented to the left in FIG. 5 and inductive reactive power is represented to the right in FIG. 5. The rated reactive power of the capacitor banks and inductor banks are shown to the left and right respectively at the points $Q_C$ rated and $Q_L$ rated respectively. In the region between the points 60 and 62 a linear representation of reactive power vs. the admittance of the switched capacitor banks and the admittance of inductor banks at a firing angle α is shown. It is to be noted that the actual reactive power supplied differs from the actual reactive power required between the points 64 and 66 as shown in FIG. 5. In this region an inactive band of reactive power or zero VARs is provided. This inactive band may be centered about the nominal voltage of the AC system $v_{nom}$. In the foregoing the following legend applies.

Q = reactive power
$B_C$ = admittance of capacitive banks switched in
$B_L(\alpha)$ = admittance of inductor at firing angle α
Δv = terminal voltage variation (H = "high", L = "low").

Figure 6:
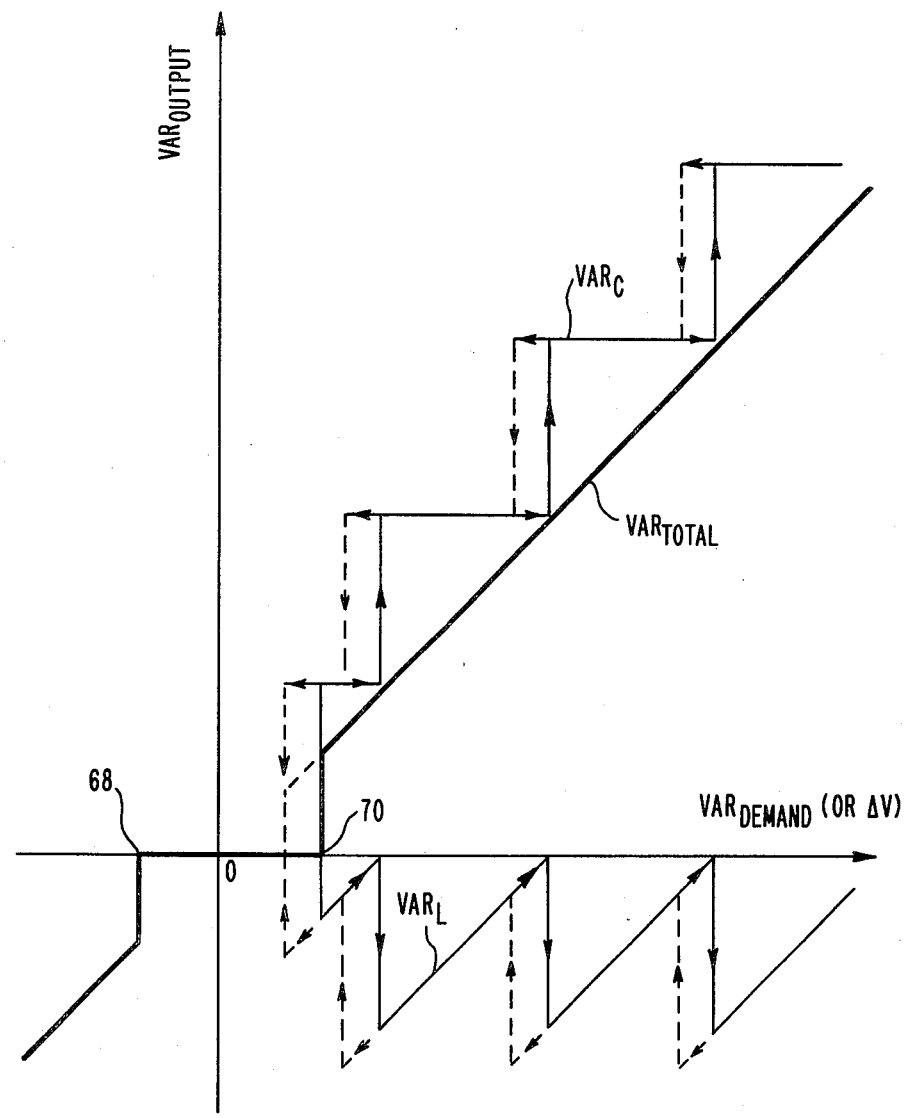
FIG. 6 shows a plot of VAR output vs. VAR demand for the apparatus of FIG. 4.

Referring now to FIG. 6 VAR outputs vs. VAR demand or Δv for the VAR generator 10 of FIG. 4 is shown. In this case it can be seen that there is a range of VAR demand or voltage differential shown between points 68 and 70 on the VAR demand axis in which no VAR output is produced. Furthermore, to the lower right the VAR output produced by the inductive element L designated $VAR_L$ is shown, it being noted that this has a characteristic sawtooth function. Furthermore, to the upper right the effect of switched in capacitive elements having a characteristic step shape and designated $VAR_C$ is shown. The addition of the $VAR_C$ output and the $VAR_L$ output produces the VAR total output ($VAR_{Total}$) shown in FIG. 6. To the lower left of point 68 it can be seen that similar linear VAR generation is provided in the capacitive range by utilizing the same principles described with respect to the portion on the right.

Figure 7:
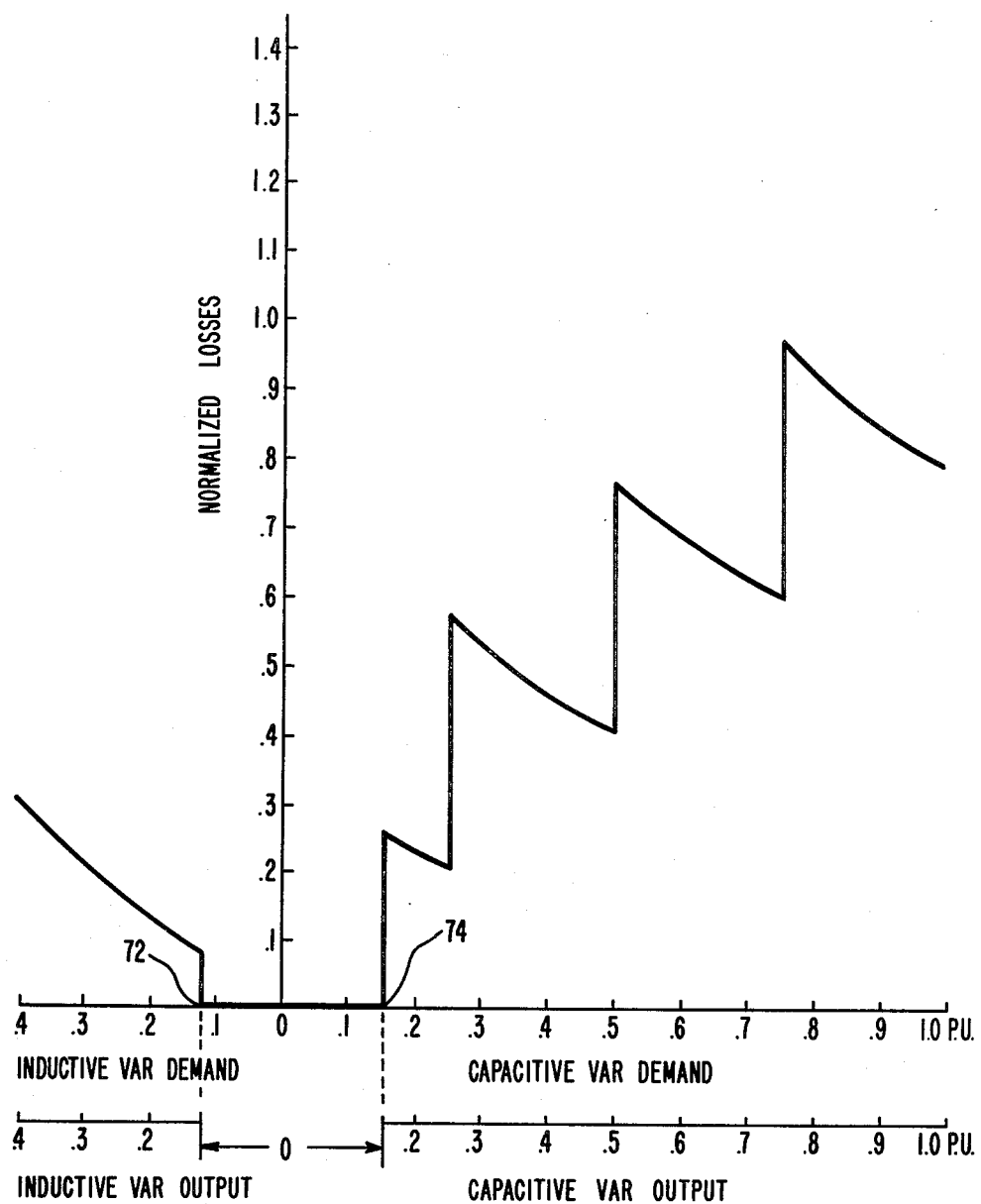
FIG. 7 shows a plot of inductive VAR demand and capacitive VAR demand vs. normalized losses for the apparatus of FIG. 4.

Referring now to FIG. 7 a plot of normalized losses vs. inductive VAR demand or inductive VAR output on the one hand and capacitive VAR demand or capacitive VAR output on the other hand is shown. It is to be noted that in the deadband region between point 72 on the left and point 74 on the right, the normalized losses are essentially equal to zero but increase as the inductive or capacitive VAR demand increases.

It is to be understood with respect to the embodiments of this invention that the particular control system and VAR generator shown is not limiting provided the appropriate actions are provided. It is also to be understood that the number of inductive elements and capacitive elements utilized for VAR compensation is not limiting. It is to be understood that the number of discrete VAR steps available may be relatively large even though control over continuous range is not obtainable without utilizing the cooperating inductive elements. It is also to be understood that the particular circuit arragement for the functional block shown in FIG. 4 in many instances are related to preferred embodiments and are not limiting as long as the function of deadband generation is provided as explained hereinbefore. It is also to be understood that the synchronous timing generator and the error to firing angle converter 28 may be of the type described in the previously mentioned U.S. Pat. No. 3,999,117.

Apparatus taught with respect to the embodiments of the invention have many advantages. One advantage lies in the fact that continuous control may be obtained in both the leading and lagging VAR regions for a static VAR generator even though a deadband of low or zero VAR generation is provided in the region of nominal voltage. Another advantage of the invention lies in the fact that the VAR system described herein provides zero VAR output if the terminal voltage variation is within a specified adjustable band to thereby reduce standby losses, but nevertheless provides VARS in proportion to the terminal voltage characteristic outside this band and within a useful range.

What I claim as my invention is:

1. A VAR generator of the type which provides a controlled conduction path for reactive current between two conductors in an electrical system across which the voltage of said electrical system may deviate from a nominal value, comprising:
   (a) capacitance means disposed as part of said conduction path for providing a capacitive component of said reactive current in said conduction path during a predetermined increment of time;
   (b) inductance means disposed as part of said conduction path for providing an inductive component of said reactive current in said conduction path during a predetermined increment of time; and
   (c) control means interconnected with said capacitance means and said inductance means for determining the magnitude of said reactive current required as a function of said deviation of said voltage from said nominal value and for cooperating with said capacitance means and said inductance means to provide said required reactive current except in a predetermined range of deviation of said voltage.

2. The combination as claimed in claim 1 wherein said inductance means and said capacitance means are interconnected in parallel circuit relationship.

3. The combination as claimed in claim 1 wherein said increment of time comprises the period of one half cycle of alternating voltage in said electrical system.

4. The combination as claimed in claim 3 wherein said alternating voltage has a frequency of 60 hz.

5. The combination as claimed in claim 3 wherein said alternating voltage has a frequency of 50 hz.

6. The combination as claimed in claim 1 wherein said inductance means comprises an inductor connected in series circuit relationship with a gated switch, the gate terminal of said gated switch comprising a control terminal which is connected to said control means, said inductive current being determined by the conduction interval of said gated switch as controlled by said control means.

7. A VAR generator of the type which provides a controlled conduction path for reactive current between two conductors in an a.c. electrical system across which the voltage of said electrical system is impressed, said latter voltage being capable of deviating from a nominal value, comprising:
   (a) discretely variable capacitance means disposed as part of said conduction path for providing any one of a plurality of predetermined fixed levels of capacitive current in said conduction path during a predetermined increment of time;
   (b) continuously variable inductance means disposed as part of said conduction path for providing any level of inductive current within a range of inductive currents in said conduction path during a predetermined increment of time; and
   (c) control means interconnected with said capacitance means, said inductance means and said electrical system for determining the magnitude of said reactive current required as a function of the change of said voltage from said nominal value and for cooperating with said capacitance means to utilize that predetermined level of fixed capacitive current which is closest in value but larger than said determined magnitude of reactive current, and for cooperating with said inductance means to choose a value of cancelling inductive current which when combined with said capacitive current will cancel a sufficient portion of said capacitive current to make said net reactive current generally equal in magnitude to said determined magnitude, said cooperation with said capacitance means and said inductance means not occurring when said voltage is within a predetermined range.

8. The combination as claimed in claim 7 wherein said control means is interconnected with said electrical system so as to provide closed loop control for the determination of said predetermined level of fixed capacitive current, said control means providing feed forward control for determining said value of cancelling inductive current.

9. The combination as claimed in claim 7 wherein said continuously variable inductance means and said discretely variable capacitance means are interconnected in parallel circuit relationship.

10. The combination as claimed in claim 13 wherein said increment of time comprises the period of one half cycle of alternating voltage in said electrical system.

11. The combination as claimed in claim 16 wherein said alternating voltage has a frequency of 60 hz.

12. The combination as claimed in claim 16 wherein said alternating voltage has a frequency of 50 hz.

13. The combination as claimed in claim 13 wherein said continuously variable inductance means comprises an inductor connected in series circuit relationship with a gated switch, the gate terminal of said gated switch comprising a control terminal which is connected to such control means, said level of inductive current being determined by the conduction interval of said gated switch as controlled by said control means.

14. The combination as claimed in claim 7, wherein said discretely variable capacitance means comprises a plurality of capacitors each of which is connected in series circuit relationship with a controlled switch, each series combination of controlled switch and capacitor being connected in parallel circuit relationship with the others, each controlled switch being interconnected with said control means, said control means actuating any combination of said controlled switches to the on state to place the corresponding capacitors into conduction to provide said predetermined fixed levels of capacitive current.

15. The combination as claimed in claim 7 wherein said predetermined range is generally symmetrical about said nominal voltage.

16. The combination as claimed in claim 13 wherein said predetermined range is generally symmetrical about said nominal voltage.

17. The combination as claimed in claim 14 wherein said predetermined range is generally symmetrical about said nominal voltage.

* * * * *